United States Patent
Hilbert et al.

(10) Patent No.: US 11,785,882 B2
(45) Date of Patent: Oct. 17, 2023

(54) AGRICULTURAL MACHINE FOR SYNCHRONIZED SEED AND GRANULATE APPLICATION

(71) Applicant: AMAZONEN-WERKE H. DREYER SE & CO. KG, Hasbergen (DE)

(72) Inventors: Florenz Hilbert, Emsdetten (DE);
Stefan Jan Johannaber, Lienen (DE);
Stephan Teckemeyer, Lotte (DE);
Thomas Wessels, Osnabrück (DE);
Markus Trentmann, Wallenhorst (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 0 days.

(21) Appl. No.: 17/769,412

(22) PCT Filed: Oct. 1, 2020

(86) PCT No.: PCT/EP2020/077439
§ 371 (c)(1),
(2) Date: Apr. 15, 2022

(87) PCT Pub. No.: WO2021/073879
PCT Pub. Date: Apr. 22, 2021

(65) Prior Publication Data
US 2022/0361396 A1 Nov. 17, 2022

(30) Foreign Application Priority Data
Oct. 17, 2019 (DE) ...................... 10 2019 128 003.6

(51) Int. Cl.
*A01C 7/06* (2006.01)
*A01C 7/04* (2006.01)
(Continued)

(52) U.S. Cl.
CPC ............... *A01C 7/06* (2013.01); *A01C 7/046* (2013.01); *A01C 7/102* (2013.01); *A01C 7/18* (2013.01); *A01C 21/005* (2013.01)

(58) Field of Classification Search
CPC .......... A01C 7/06; A01C 7/046; A01C 7/102; A01C 7/18; A01C 7/121; A01C 7/122; A01C 21/005
See application file for complete search history.

(56) References Cited

U.S. PATENT DOCUMENTS 349,799 A * 9/1886 Jenkins ................ A01C 7/06
111/73
682,473 A * 9/1901 Lindsay, Jr. ............ A01C 7/18
111/32
(Continued)

FOREIGN PATENT DOCUMENTS

DE 102010017127 A1 * 7/2011 ............... A01C 7/06
DE 102010017127 A1 7/2011
(Continued)

OTHER PUBLICATIONS

International Search Report for related patent application PCT/EP2020/077439 issued by the European Patent Office dated Jan. 20, 2021, English translation provided.
(Continued)

*Primary Examiner* — Alicia Torres
(74) *Attorney, Agent, or Firm* — Hassan Abbas Shakir; Shakir Law PLLC

(57) ABSTRACT

An agricultural machine for the combined application of seed and granulate on an agricultural area includes a separating device, a portioning device, and a control device. The separating device has a rotationally drivable separating element for separating seed grains and the portioning device has a rotationally drivable portioning element for producing granulate portions. The control device matches the rotational
(Continued)

movements of the separating element and the portioning element to each other to implement a predetermined depositing relationship of the seed grains and the granulate portions on the agricultural area.

17 Claims, 5 Drawing Sheets

(51) Int. Cl.
*A01C 7/10* (2006.01)
*A01C 7/18* (2006.01)
*A01C 21/00* (2006.01)

(56) References Cited

U.S. PATENT DOCUMENTS

| | | | | | |
|---|---|---|---|---|---|
| 1,229,604 | A | * | 6/1917 | Garst | A01C 5/06 111/80 |
| 2,023,655 | A | * | 12/1935 | White | A01C 7/06 111/194 |
| 2,035,058 | A | * | 3/1936 | Feltman | A01C 7/06 222/529 |
| 9,226,442 | B2 | * | 1/2016 | Grimm | A01C 7/06 |
| 9,730,379 | B2 | * | 8/2017 | Wendte | A01C 7/20 |
| 11,013,166 | B2 | * | 5/2021 | Boetsch | A01C 7/16 |
| 2015/0351315 | A1 | | 12/2015 | Wendte et al. | |

FOREIGN PATENT DOCUMENTS

| | | | |
|---|---|---|---|
| DE | 102015101256 | A1 * | 7/2016 |
| DE | 102018120064 | A1 | 2/2020 |
| EP | 0216057 | A1 | 4/1987 |
| EP | 0654207 | A1 | 5/1995 |
| EP | 1415523 | A1 | 5/2004 |
| EP | 2342966 | A1 | 7/2011 |
| EP | 3257348 | A1 | 12/2017 |
| WO | 2010129546 | A1 | 11/2010 |

OTHER PUBLICATIONS

Written Opinion of the International Searcing Authority for related patent application PCT/EP2020/077439 issued by the European Patent Office dated Jan. 20, 2021, English translation provided.
Search Report for related patent application DE 10 2019 128 003.6 issued by the German Patent Office dated Jul. 16, 2020, partial machine translation provided.
Translation of an office action dated Oct. 31, 2022 issued by the Eurasian Patent Office in Eurasian Patent Application No. 202291130, 3 pgs, English.

* cited by examiner

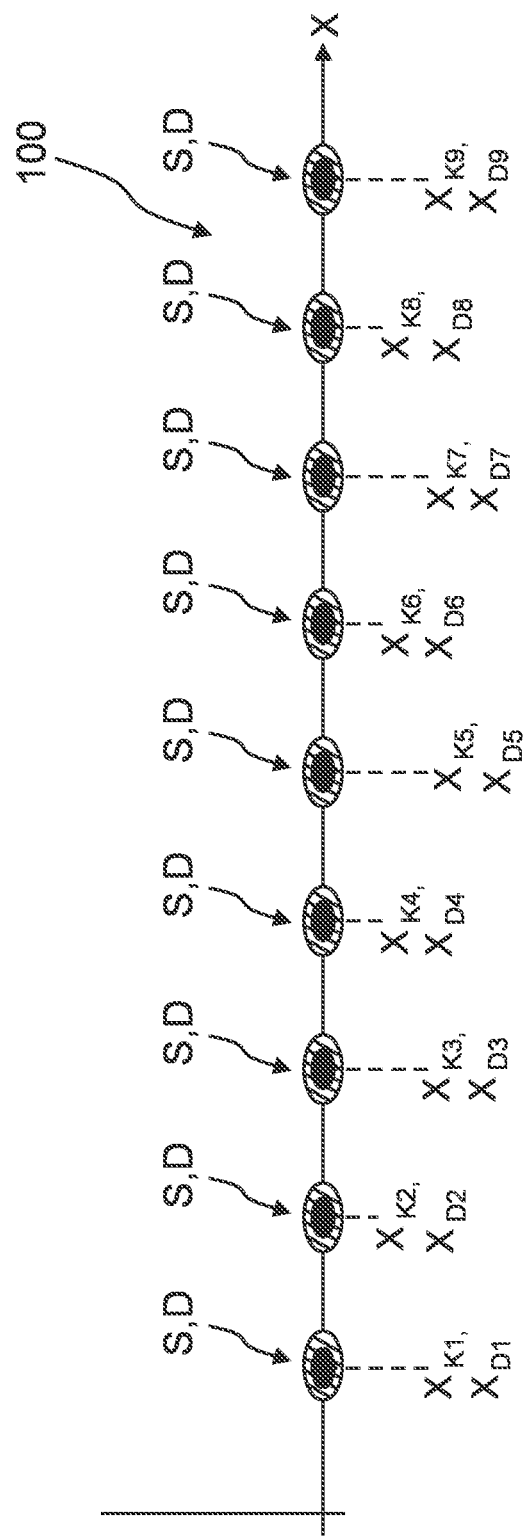

AGRICULTURAL MACHINE FOR SYNCHRONIZED SEED AND GRANULATE APPLICATION

CROSS-REFERENCE TO RELATED APPLICATIONS

This application is a national stage application under 35 U.S.C. § 371 claiming priority to application PCT/EP2020/077439 filed 1 Oct. 2020. Application PCT/EP2020/077439 is a PCT application claiming priority to German patent application DE 10 2019 128 003.6 filed 17 Oct. 2019. Both applications, separately, are incorporated by reference in their entirety for all purposes.

BACKGROUND OF THE INVENTION

1. Field of the Invention

The invention relates to an agricultural application machine for the combined application of seed and granulate, in particular fertilizer and/or pesticide, on an agricultural area and to a method for the combined application of seed and granulate to an agricultural area by means of an agricultural application machine, in particular an agricultural application machine.

2. Discussion of the Related Art

In the prior art, agricultural application machines are known with which seed and granulate, such as fertilizers, insecticides, fungicides and/or other crop protection agents, can be applied simultaneously to an agricultural area. For separating seed grains, the agricultural application machine can have a separating device, which comprises a rotationally drivable separating element.

In order to save granulate, efforts are being made to replace the previously common band application of granulate by dispensing individual granulate portions. When dispensing granulate in portions, the individual granulate portions must be deposited in the vicinity of the separated seed grains. In this context, the problem is that grain separation and granulate portioning must be suitably synchronized so that the seed grains and the granulate portions assigned to the individual seed grains are deposited on the agricultural area in substantially the same location.

The synchronized depositing of the seed grains and the granulate portions has so far only been possible with a high degree of control effort. The known synchronization solutions are comparatively susceptible to faults and are prone to inaccuracies in the depositing of the seed grains and the granulate portions.

The object of the invention is thus to simplify the synchronized depositing of seed grains and granule portions.

SUMMARY OF THE INVENTION

The object is solved by an agricultural application machine of the type mentioned above, wherein the agricultural application machine according to the invention has a control device which is configured to coordinate the rotational movements of the separating element and the portioning element to implement a predetermined depositing relationship of the seed grains and the granulate portions on the agricultural area.

The invention makes use of the knowledge that rotational movements of two rotationally drivable elements can be matched to each other with comparatively little effort. In the agricultural application machine according to the invention, the rotational movements of the separating element and the portioning element are synchronized with each other to implement a predetermined depositing relationship of the seed grains and the granulate portions on the agricultural area. The control device is preferably configured to automatically initiate and/or carry out the matching of the rotational movements of the separating element and the portioning element to each other.

In a preferred embodiment of the agricultural application machine according to the invention, the control device is configured to match the rotational speeds of the separating element and the portioning element to each other to implement a predetermined depositing relationship of the seed grains and the granulate portions. Preferably, each seed grain is assigned to a granulate portion so that the depositing frequency of the seed grains and the granulate portions matches or is identical. The separating device is preferably configured to provide a plurality of separated seed grains for depositing on the agricultural area during one rotation of the separating element. The portioning device is preferably configured to provide one or more granulate portions for depositing on the agricultural area during one rotation of the portioning element. The number of separated seed grains provided during one rotation of the separating element preferably differs from the number of granulate portions provided during one rotation of the portioning element. Thus, to synchronize the depositing cycle of the separating device and the portioning device, the rotational speeds of the separating element and the portioning element must be matched to each other. Consequently, a suitable transmission ratio must be set between the separating element and the portioning element. For example, the transmission ratio can be 1:42 if the separating device provides 42 separated seed grains for depositing on the agricultural area during one rotation of the separating element and the portioning device provides one granulate portion for depositing on the agricultural area during one rotation of the portioning element. The separating element can be, for example, a separating disk with 42 grain receiving recesses. The portioning element can, for example, be a portioning blade, which collects a plurality of granulate seeds located in a portioning chamber of the portioning device during one rotation and combines them into one granulate portion.

In an advantageous further development of the agricultural application machine according to the invention the control device is configured to match the rotational angles of the separating element and the portioning element to each other for implementing a predetermined longitudinal spacing of the seed grains and the granulate portions on the agricultural area. Since the rotational movements of the separating element and the portioning element are periodic, a suitable phase shift between the rotational movements of the separating element and the portioning element is set by matching the rotational angles of the separating element and the portioning element to each other. Despite a synchronized depositing frequency of the seed grains and the granulate portions, an unintended longitudinal spacing between the seed grains and the granulate portions may occur. This longitudinal spacing is due to an unsuitable rotational angle relationship or phase shift between the rotational movements of the separating element and the portioning element. For example, the rotational speed of the separating element and/or the portioning element can be temporarily changed in order to match the rotational angles of the separating element and the portioning element to each other or to set the appropriate phase shift between the rotational movements of the separating element and the portioning element. The separating element and/or the portioning element can, for example, be temporarily decelerated or accelerated. Thus, to change the longitudinal spacing of the seed grains and granulate portions on the agricultural area, the phase relationship of the separating element and the portioning element must be adjusted. For example, the intended longitudinal spacing of the individual seed grains and of the individual granulate portions assigned to each seed grain on the agricultural area may be zero if the seed grains and the granulate portions are deposited at different depositing depths on the agricultural area. However, the intended longitudinal spacing of the individual seed grains and the individual granulate portions assigned to each seed grain on the agricultural area may be a defined spacing value greater than zero, for example, if a sufficient vertical spacing of the depositing depths cannot be realized with the application machine. If it is not possible to realize a sufficient vertical spacing of the depositing depths with the application machine, it is often necessary to set a minimum longitudinal spacing between the seed grains and the granulate portions assigned to the individual seed grains, which prevents the seed grains from being etched by the granulate. Depending on the specific implementation of the rotational angle adjustment, an unintentional phase shift in the rotational movements of the separating element and the portioning element can also be tolerated initially, which is then gradually or in one go reduced or eliminated.

In an advantageous further development of the agricultural application machine according to the invention the separating element and the portioning element are mechanically coupled to each other. The coupling can be implemented, for example, by means of a mechanical transmission, which is configured to transmit the rotational movement of the portioning element to the separating element while adapting the rotational speed. Alternatively, the mechanical transmission can be configured to transmit the rotational movement of the separating element to the portioning element while adapting the rotational speed. The mechanical transmission may include a chain or belt drive. The rotational angle relationship between the separating element and the portioning element can be adjusted by means of a chain or belt tensioner.

In a further preferred embodiment of the agricultural application machine according to the invention it is provided that the separating device has a grain depositing channel and the portioning device has a granulate depositing channel, and that an opening of the grain depositing channel facing away from the separating device is arranged in front of an opening of the granulate depositing channel facing away from the portioning device in the working direction of the application machine in such a way that the separating device and the portioning device are configured to dispense into the same depositing area. In particular, it is provided that the portioning device and the separating device are thus configured to dispense into the same furrow. This can be advantageous in order to supply the seed with granulate as optimally as possible, whether by covering the seed with granulate, by placing the granulate between the seed grains or directly next to, i.e. in front of or behind, the seed grain.

In a further preferred embodiment of the agricultural application machine according to the invention, the control device is configured to take into account the current rotational angle of the separating element and/or the current rotational angle of the portioning element when matching the rotational movements of the separating element and the portioning element to each other. The current rotational angle of the portioning element can be derived from the power consumption of the portioning drive if this is designed as an electric motor. The power consumption of the portioning drive can also be evaluated to detect blockages, foreign bodies or increasing contamination, for example in the housing of the portioning device. Furthermore, the power consumption of the portioning drive can be used to check whether granulate portioning is taking place in the portioning device. If this is not the case, it can be assumed that granulate conveying upstream or downstream of the portioning device is impaired, for example due to a blockage in a conveying line or in a dosing system for the granulate. If the agricultural application machine has a plurality of portioning devices, the power consumptions of the individual portioning drives can be compared with each other. This comparison makes it possible to monitor the application of a uniform amount of granulate in each row. Furthermore, the power consumption of the portioning drive can be used to monitor that the granulate quantity per granulate portion is consistent. If the power consumption during the rotation cycles of the portioning element follows a constant pattern, the individual granulate portions produced will have the same or approximately the same size. If the power consumption pattern of the portioning drive shows irregularities, this indicates a varying granulate quantity in the individual granulate portions. The power consumption of the portioning drive can also be evaluated for comparing the quantity of granulate dispensed by a central or decentralized dosing device while checking the machine settings prior to the actual application with the quantity of granulate applied. If the flight time of the granulate portion until dispensing to the agricultural area depends on friction values or other granulate properties, the power consumption of the portioning drive can be used to predict the flight time. The quantity of each granulate portion can be determined via the torque of the portioning drive, which means that it is no longer necessary to check the machine settings prior to the actual application. The timing of portion dispensing at the portioning device can be determined by a sudden drop in power consumption or a sudden drop in torque. This can also predict the time of depositing on the agricultural area.

Alternatively or additionally, the control device of the agricultural application machine according to the invention is configured to take into account presence times of separated seed grains within a grain detection area in the grain depositing channel behind the separating device and/or presence times of produced granulate portions within a granulate detection area in the granulate depositing channel behind the portioning device when matching the rotational movements of the separating element and the portioning element to each other. The presence times of individual seed grains can be detected by means of a sensor, in particular an optosensor, which monitors the grain detection area in the grain depositing channel. The presence times of produced granulate portions can be detected by means of a sensor, in particular an optosensor, which monitors the granulate detection area in the granulate depositing channel. The following sensors can be used to detect the granulate portions or the seed grains: acoustic sensors, optical sensors, radar sensors, ultrasonic sensors, contact and/or impact sensors, for example in the housing of the separating device or the portioning device or in the grain depositing channel or the granulate depositing channel. The following approaches are conceivable for detecting the rotational angle position of the separating element and/or the portioning element: Encoder/rotary encoder, inductive sensor, optical sensor, reed switch and/or power consumption measurement. The accuracy of the depositing synchronization can be improved by using a plurality of sensors in the grain depositing channel or the granulate depositing channel to detect a plurality of presence times of separated seed grains or produced granulate portions. Improvement of the depositing synchronization can also be improved by calculating the flight velocities of the separated seed grains and/or the produced granulate portions through the grain depositing channel or the granulate depositing channel, respectively.

For example, the grain separation can set the cycle for the synchronization. This is a kind of prediction model when the granulate depositing device of the agricultural application machine runs in the direction of travel in front of the grain depositing device of the agricultural application machine and the portioning device can therefore not react directly to a detected seed grain. The presence times of the separated seed grains in the detection area of the grain depositing channel or the current rotational angle of the separating element determine where the granulate portions are to be placed in the furrow on the agricultural area. The flight time of the seed grain to the bottom of the furrow must be taken into account. Since the sowing thickness and thus the theoretical grain spacing are known, all further depositing times can be calculated in advance via the determined depositing time of the seed grain. For example, the granulate depositing runs 5 to 7 grains ahead, wherein this depends on the design of the seeding unit. The current travel speed of the agricultural application machine can then be used to determine the distance that has been covered since the detected seed grain was deposited. If the distance covered corresponds to the grain spacing, the portioning device must have deposited the granulate portion in the furrow. If the portioning device is driven by an electric motor, the speed must change briefly to match the two cycles to each other. During this time, the rotational speed ratio between the separating element and the portioning element also changes temporarily. Alternatively, the granulate portioning can set the cycle for the synchronization. In this case, the granulate portioning passes on the depositing cycle to the separating device via the control device. The presence times of the produced granulate portions in the granulate detection area of the granulate depositing channel or the current rotational angle of the portioning element determine when the seed grain is to be deposited in the furrow. Here, the flight time of the granulate to the bottom of the furrow must be taken into account. The traveled distance is calculated using the current travel speed of the application machine, but in this case the separating device can react to the detected granulate portion because the seed grain is deposited after the granulate portion is deposited. If the separating device is driven by an electric motor, the speed must be changed briefly to match the two cycles to each other. During this time, the rotational speed ratio between the separating element and the portioning element also changes temporarily. In this case, it is also not necessary to calculate the seed grain depositing in advance using the theoretical grain spacing. After the application machine has been placed into the soil, a seed grain can be assigned to each granulate portion. Likewise, a signal could be transmitted before the application machine is lifted from the soil, so that either the granulate portioner stops before the separating or the separating runs longer. Alternatively, neither the grain separation nor the granulate portioning sets the cycle for the synchronization. In this case, the depositing time is specified by a control routine. The grain separation and granulate portioning adjust their cycles to the specified depositing times. This allows all rows on the application machine to be forced to deposit in parallel, transverse to the direction of travel, so that subsequent treatment transverse to the rows is possible, for example, for weed control and/or by means of transverse hoeing.

There may be depositing relationships among the rows. For example, the seed grains are deposited in a staggered manner from row to row. This results in better stand space allocation and improved nutrient availability. It would also be conceivable to reduce the row spacing.

In a further preferred embodiment of the agricultural application machine according to the invention, the control device is configured to take into account depositing times of separated seed grains on the agricultural area and/or depositing times of produced granulate portions on the agricultural area when matching the rotational movements of the separating element and the portioning element to each other. The depositing times of individual seed grains and/or produced granulate portions can be detected by means of a sensor and/or a camera, which is aligned to the agricultural area, in particular to the seed furrow. The camera-based detection of the depositing times of individual seed grains and/or of the depositing times of produced granulate portions is particularly advantageous when light-colored, for example stained, seed grains and/or light-colored granulate is applied to the agricultural area. Due to the contrast to the dark soil of the agricultural area, the camera-based or sensor-based detection of seed grains and/or granulate portions can be particularly precise. It is further advantageous to have an agricultural application machine according to the invention, in which the control device, when matching the rotational movements of the separating element and the portioning element to each other, is configured to take into account the length of a grain depositing channel behind the separating device, the length of a granulate depositing channel behind the portioning device, the length of a grain depositing channel behind a grain detection area in the grain depositing channel, in which the presence of separated seed grains is monitored, and/or the length of a granulate depositing channel behind a granulate detection area in the granulate depositing channel, in which the presence of produced granulate portions is monitored. Furthermore, when matching the rotational movements of the separating element and the portioning element to each other, the control device can take into account the rotational speed of the separating element, the rotational speed of the portioning element, the current travel speed of the agricultural application machine, the intended sowing thickness and/or the intended seed application rate. In addition, the control device can also take into account the time of conveying a seed grain through the grain depositing channel or the time of conveying a granulate portion through the granulate depositing channel. The speed of movement of the separated seed grains within the grain depositing channel is dependent upon the rotational speed of the separating element. The speed of movement of the produced granulate portions within the granulate depositing channel is dependent upon the rotational speed of the portioning element. The travel speed must be taken into account, since the dispensing of the separated seed grains and the produced granulate portions takes place at longitudinally spaced points of the agricultural application machine.

In a further development of the agricultural application machine according to the invention, the control device, when matching the rotational movements of the separating element and the portioning element to each other, is configured to determine the time required for the seed grains and/or the granulate portions to be deposited on the agricultural area. For this purpose, the control device preferably takes into account the grain weight of the seed grains, the portion weight of the granulate portions, the grain shape of the seed grains, the granulate shape, the grain size of the seed grains, the surface condition of the seed grains, the surface condition of the granulate, a blower pressure of a blower which generates an air flow transporting the seed grains, and/or a blower pressure of a blower which generates an air flow transporting the granulate. The surface condition of the seed grains provides information about the friction behavior of the seed grains. The surface condition of the granulate provides information about the friction behavior of the granulate.

In another preferred embodiment of the agricultural application machine according to the invention, the separating device has a separating drive for the separating element. The separating drive can be an electric, mechanical, pneumatic or hydraulic drive. Alternatively or additionally, the portioning device has a portioning drive for the portioning element. The portioning drive can be an electric, mechanical, pneumatic or hydraulic drive. In particular, the control device is configured to control the separating drive and/or the portioning drive to set a rotational speed ratio between the separating element and the portioning element. The rotational speed ratio concerns the ratio between the rotational speed of the separating element and the rotational speed of the portioning element. A suitable rotational speed ratio depends in particular on the number of separated seed grains provided by the separating device during one rotation of the separating element and the number of granulate portions provided by the portioning device during one rotation of the portioning element. In particular, the control device is configured to control the separating drive and/or the portioning drive to set a rotational angle ratio between the separating element and the portioning element. Since the rotational speeds of the separating element and the portioning element preferably differ from each other, the rotational angle ratio is a dynamic value, with the value progression repeating periodically.

In an advantageous further development of the agricultural application machine according to the invention the control device is configured to control the separating drive in such a way that the rotational speed of the separating element is temporarily adjusted to change the rotational angle ratio between the separating element and the portioning element. For example, the separating element can be temporarily accelerated or decelerated to change the rotational angle ratio between the separating element and the portioning element. By temporarily accelerating or decelerating the separating element, a phase shift occurs between the rotational movements of the separating element and the portioning element, so that the longitudinal spacing between the deposited seed grains and the deposited granulate portions is changed.

In another preferred embodiment of the agricultural application machine according to the invention, the control device is configured to control the portioning drive in such a way that the rotational speed of the portioning element is temporarily adjusted to change the rotational angle ratio between the separating element and the portioning element. For example, the portioning element can be temporarily accelerated or decelerated to change the rotational angle ratio between the separating element and the portioning element. By temporarily accelerating or decelerating the portioning element, a phase shift is set between the rotational movements of the separating element and the portioning element. In this way, the longitudinal spacing between the deposited seed grains and the deposited granulate portions is adjusted.

In another preferred embodiment of the agricultural application machine according to the invention, the control device is configured to control the portioning drive to implement a belt application of the granulate on the agricultural area. Thus, the agricultural application machine is able to switch from synchronized seed and granulate depositing to belt application of the granulate. In particular in the case of poor granulate quality, for example in the case of moist, lumpy granulate or granulate containing foreign bodies, in the case of braking and/or acceleration processes or in the case of other malfunctions, synchronized seed and granulate depositing has a high risk of incorrect depositing, so that in these cases belt application of the granulate is more advantageous. Belt application of the granulate can be implemented, for example, by stopping the portioning element so that no portion formation by the portioning device occurs. In this case, the granulate can be conveyed through the housing of the portioning device without any portioning occurring. The granulate can be conveyed through the housing of the portioning device, for example, pneumatically or by gravity. In this case, it may be advantageous to stop the portioning element between the granulate inlet and the housing outlet. Furthermore, a high-speed operation of the portioning element is conceivable, in which the portioning element rotates so fast that no granulate portions are produced, but a continuous granulate flow results.

In a further preferred embodiment of the agricultural application machine according to the invention, the latter has an input device via which a user can input an actual depositing relationship of separated seed grains and produced granulate portions on the agricultural area obtained during a calibration run of the agricultural application machine. Preferably, the control device is configured to match the rotational movements of the separating element and the portioning element to each other to implement a predetermined depositing relationship of the seed grains and the granulate portions based on the actual depositing relationship entered by the user and relating to the calibration run. The calibration run must be performed by the user at the intended application speed. To determine the actual depositing relationship of the seed grains and granulate portions deposited during the calibration run, they must first be identified on the agricultural area. This may require, for example, digging up the deposited seed and/or granulate portions. To determine the actual depositing relationship, the user must record the longitudinal offset between the deposited seed grains and granulate portions. This can be done, for example, by manually measuring the distance using a distance measuring device such as a tape measure. The control device of the agricultural application machine is preferably configured to set a suitable rotational speed ratio between the separating element and the portioning element and/or a suitable rotational angle ratio between the separating element and the portioning element on the basis of the inputted data relating to the calibration run. The object of the invention is further solved by a method of the kind mentioned above, wherein the method according to the invention comprises matching the rotational movements of the separating element and the portioning element to each other to implement a predetermined depositing relationship of the seed grains and the granulate portions by means of a control device of the agricultural application machine. In particular, the method is carried out by means of an agricultural application machine according to any of the embodiments described above. Thus, with respect to the advantages and modifications of the method according to the invention, reference is first made to the advantages and modifications of the agricultural application machine according to the invention.

In a preferred embodiment of the method according to the invention, the rotational speeds of the separating element and the portioning element are matched to each other by means of the control device in order to implement a predetermined depositing frequency of the seed grains and the granulate portions. Alternatively or additionally, the rotational angles of the separating element and the portioning element are matched to each other by means of the control device to implement a predetermined longitudinal spacing of the seed grains and the granulate portions on the agricultural area. Matching the rotational angles of the separating element and the portioning element to each other preferably comprises setting a periodically repeating phase shift pattern between the rotational angles of the separating element and the portioning element.

In an advantageous further development of the method according to the invention, the rotational movements of the separating element and the portioning element are matched to each other by a mechanical coupling of the separating element and the portioning element. The mechanical coupling allows the rotational speeds and/or the rotational angles of the separating element and the portioning element to be matched to each other.

In an advantageous further development of the method according to the invention, the current rotational angle of the separating element and/or the current rotational angle of the portioning element is taken into account when matching the rotational movements of the separating element and the portioning element to each other. Alternatively or additionally, presence times of separated seed grains within a grain detection area in a grain depositing channel behind the separating device and/or presence times of produced granulate portions within a granulate detection area in a granulate depositing channel behind the portioning device are taken into account when matching the rotational movements of the separating element and the portioning element to each other.

Furthermore, a method according to the invention is advantageous, in which depositing times of separated seed grains on the agricultural area and/or depositing times of produced granulate portions on the agricultural area are taken into account when matching the rotational movements of the separating element and the portioning element to each other. In particular, the method comprises detecting separated seed grains and/or produced granulate portions on the agricultural area. The detecting of the separated seed grains and/or the produced granulate portions on the agricultural area can, for example, be camera-based and/or sensor-based.

Furthermore, a method according to the invention is advantageous, in which, when matching the rotational movements of the separating element and the portioning element to each other, the length of a grain depositing channel behind the separating device, the length of a granulate depositing channel behind the portioning device, the length of a grain depositing channel behind a grain detection area in the grain depositing channel, in which the presence of separated seed grains is monitored, and/or the length of a granulate depositing channel behind a granulate detection area in the granulate depositing channel, in which the presence of produced granulate portions is monitored, is taken into account. Furthermore, it is advantageous if the rotational speed of the separating element, the rotational speed of the portioning element, the current travel speed of the agricultural application machine, the intended sowing thickness and/or the intended seed application rate are taken into account when matching the rotational movements of the separating element and the portioning element to each other. When matching the rotational movements of the separating element and the portioning element to each other, the time required for the separated seed grains to move through the grain depositing channel or a section of the grain depositing channel can also be taken into account. Furthermore, when matching the rotational movements of the separating element and the portioning element to each other, the time required for the granulate portions to move through the granulate depositing channel or a section of the granulate depositing channel can be taken into account.

Furthermore, a method according to the invention is advantageous, in which the separating device has a separating drive for the separating element and the portioning device has a portioning drive for the portioning element. The method preferably comprises controlling the separating drive to set a rotational speed ratio and/or a rotational angle ratio between the separating element and the portioning element. Alternatively or additionally, the method comprises controlling the portioning drive to set a rotational speed ratio and/or a rotational angle ratio between the separating element and the portioning element. In particular, the method comprises temporarily accelerating and/or decelerating the separating element and/or the portioning element to set a rotational angle ratio between the separating element and the portioning element. Alternatively or additionally, the method comprises setting a rotational speed of the separating element and/or the portioning element to implement an intended rotational speed ratio between the separating element and the portioning element.

BRIEF DESCRIPTION OF THE DRAWINGS

In the following, preferred embodiments of the invention are explained and described in more detail with reference to the accompanying drawings. The Figures show:

FIG. 5 shows a plurality of separated seed grains and a plurality of produced granulate portions after matching the rotational angles of the separating element and the portioning element to each other.

DETAILED DESCRIPTION OF THE INVENTION

Figure 1:
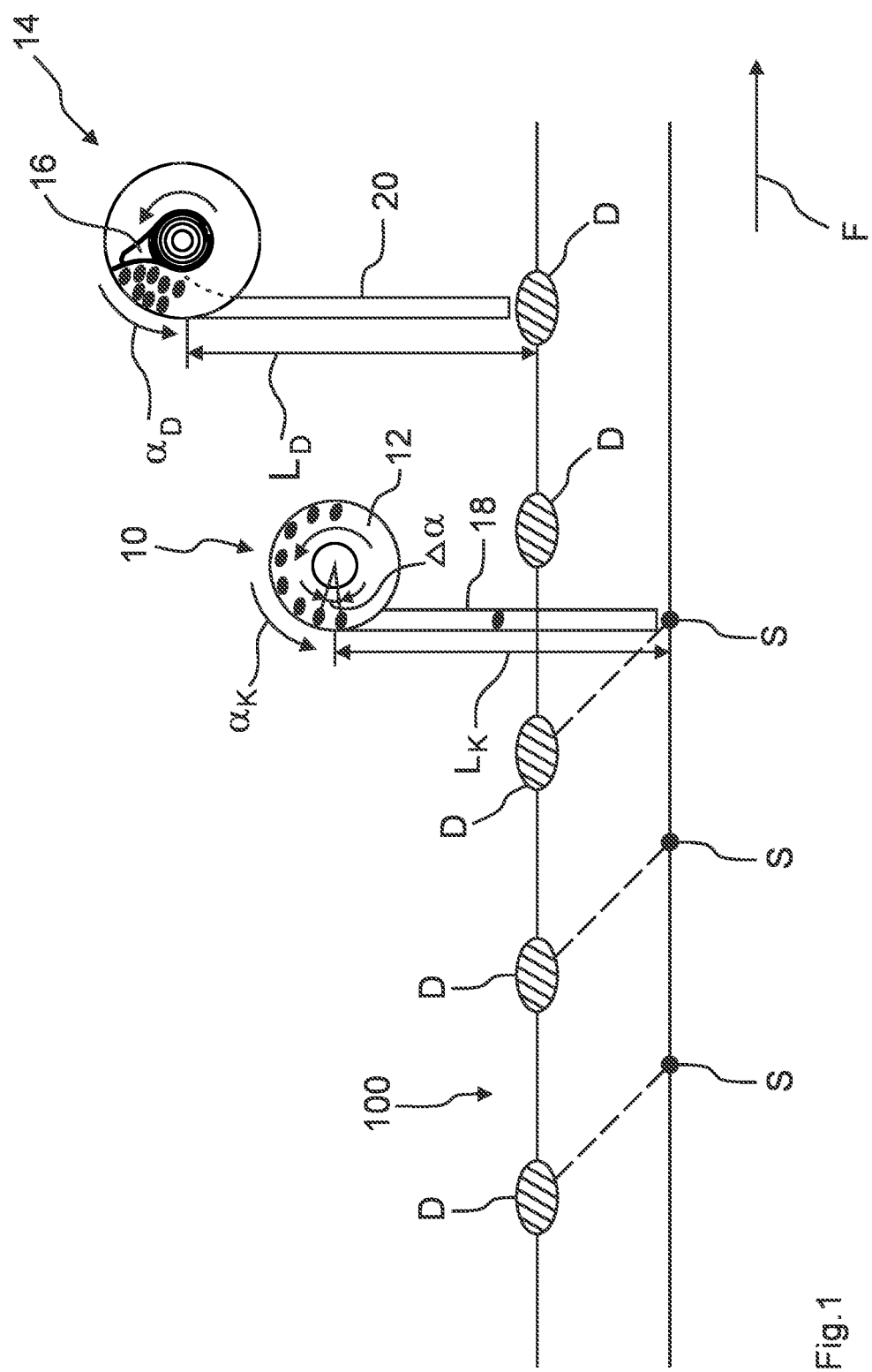
FIG. 1 shows a schematic representation of a separating device and a portioning device of an application machine according to the invention.

FIG. 1 shows a separating device 10 and a portioning device 14 of an agricultural application machine, which is configured for the combined application of seed and granulate on an agricultural area 100. In the present embodiment, the separating device 10 is arranged behind the portioning device 14 in the working direction of the application machine. In an embodiment of the application machine, which is not shown, an opening of a granulate depositing channel 20 adjoining the portioning device 14 is arranged behind an opening of a grain depositing channel 18 adjoining the separating device 10 in such a way that the portioning device 14 and the separating device 10 are configured to dispense seed and granulate into the same depositing area. It may be advantageous to dispense granulate into a furrow on top of seed grains that have been dispensed in advance by the separating device 10. It may further be advantageous to dispense granulate, for example in the form of slug pellets, onto the usable area located above a seed grain. It is also conceivable that granulate is dispensed between the areas located between the seed grains. In this embodiment, which is not shown, the portioning device 14 may be arranged under a separate storage container, for example for storing microgranulate.

The separating device 10 has a separating element 12, which is designed as a rotationally drivable separating disc for separating seed grains S. The separating device 10 is configured to provide a plurality of separated seed grains S for depositing on the agricultural area 100 during one rotation of the separating element 12. This is implemented in that the separating element 12, which is designed as a separating disk, has a plurality of grain receiving recesses which have an angular distance $\Delta\alpha$ from one another. During one rotation of the separating element 12, the individual grain receiving recesses each receive a single seed grain S and then dispense the separated seed grain to a grain depositing channel 18 in a specific rotational angle position of the separating element 12. The separating device has a separating drive for the separating element 12. The separating drive can be an electric, mechanical, pneumatic or hydraulic drive. After the separated seed grains S have moved through the grain depositing channel 18, they are deposited on the agricultural area 100. The grain depositing channel 18 has a length $L_K$.

The portioning device 14 has a rotationally drivable portioning element 16, which is designed as a portioning blade, for producing granulate portions D. The portioning device 14 is configured to provide a portion of granulate D for depositing on the agricultural area 100 during one rotation of the portioning element 16. The portioning device 14 has a portioning drive for the portioning element 16. The portioning drive can be an electric, mechanical, pneumatic or hydraulic drive. The granulate portions D provided by the portioning device 14 are deposited onto the agricultural area 100 via a granulate depositing channel 20. The granulate depositing channel 20 has a length $L_D$.

The portioning device 14 is further configured to implement a belt application of granulate. For this purpose, the portioning drive can be controlled in such a way that either the portioning element 16 is stopped in the position indicated by the dashed lines between the granulate depositing channel 20 and an inlet for the granulate, which is not shown in more detail, so that the granulate flows pneumatically from the inlet through the portioning device 14 in the direction of rotation indicated by the curved arrow and is deposited as a band on the agricultural area via the granulate depositing channel 20, or that the portioning element 16 is driven very quickly so that an almost continuous flow of granulate results which is deposited via the granulate depositing channel 20 on the agricultural area.

The agricultural application machine further has a control device, wherein the separating device 10 and the portioning device 14 are connected to the control device. The control device is configured to match the rotational movements of the separating element 12 and the portioning element 16 to each other to implement a predetermined depositing relationship of the seed grains S and the granulate portions D on the agricultural area 100. The rotational movements of the separating element 12 and the portioning element 16 are synchronized with each other by the control device to implement a predetermined depositing relationship of the seed grains S and the granulate portions D on the agricultural area 100. For this purpose, the control device is configured to automatically initiate the matching of the rotational movements of the separating element 12 and the portioning element 16 to each other.

Figure 2:
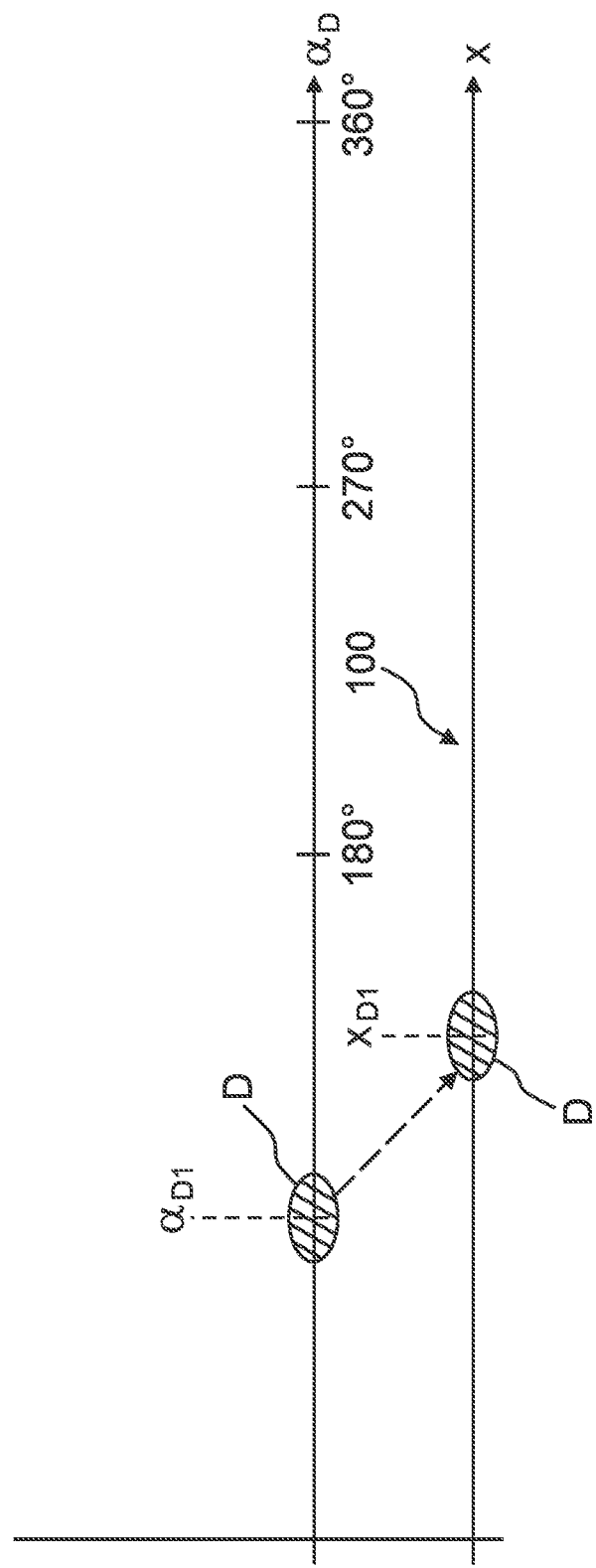
FIG. 2 shows a schematic representation of a granulate portion produced with the portioning device shown in FIG. 1.
Figure 3:
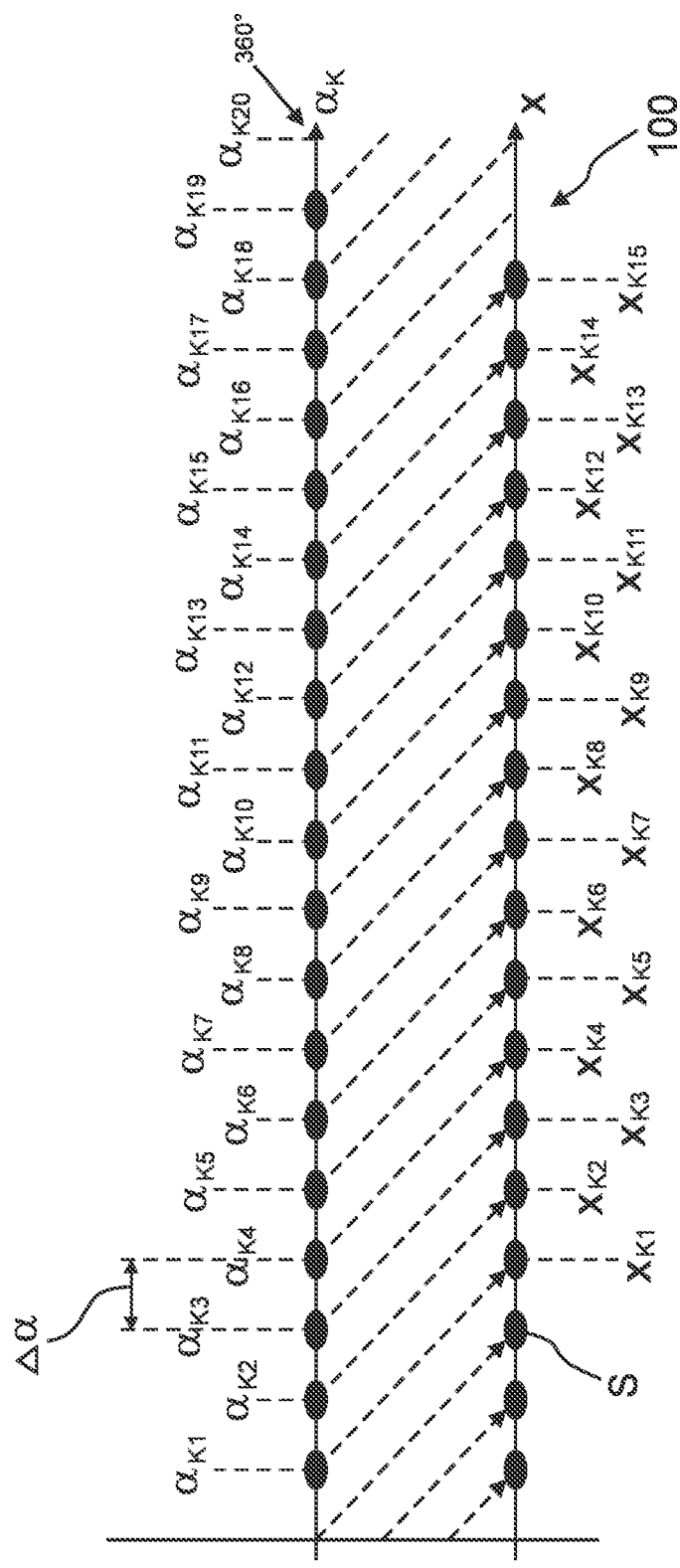
FIG. 3: shows a schematic representation of a plurality of seed grains separated by the separating device shown in FIG. 1.

FIGS. 2 and 3 show that the number of granulate portions D provided during one rotation of the portioning element 16 differs from the number of separated seed grains S provided during one rotation of the separating element 12.

Thus, to synchronize the depositing cycle of the separating device 10 and the portioning device 14, the rotational speeds of the separating element 12 and the portioning element 16 must be matched to each other. Consequently, a suitable transmission ratio must be set between the separating element 12 and the portioning element 16 if the depositing frequency of the seed grains S and the granulate portions D is to be identical.

FIG. 2 shows that the portioning device 14 provides a granulate portion D at a provision angle $\alpha_{D1}$ of the portioning element 16. The granulate portion D requires a specific duration for moving through the granulate depositing channel 20, so that the granulate portion D is deposited onto the agricultural area 100 at the depositing position $x_{D1}$. The Figure also shows that only one granulate portion D is provided by the portioning device 14 during one rotation of the portioning element 16. However, in other embodiments, a plurality of granulate portions D may be provided by the portioning device 14 during one rotation of the portioning element 16.

FIG. 3 shows that the separating device 10 provides a separated seed grain S at each of the provision angles $\alpha_{K1}$-$\alpha_{K20}$ of the separating element 12. The separated seed grains S require a specific time for moving through the grain depositing channel 18, which is located behind the separating device 10. The separated seed grains S are then deposited at the depositing positions $x_{K1}$-$x_{K15}$ on the agricultural area 100.

The control device is configured to match the rotational speeds of the separating element 12 and the portioning element 16 to each other to implement a predetermined depositing frequency of the seed grains S and the granulate portions D.

Figure 4:
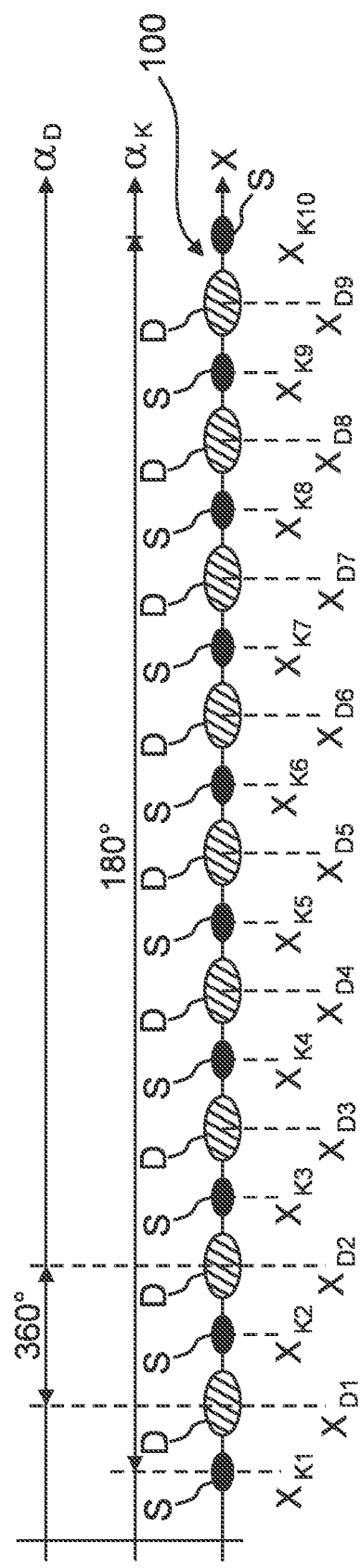
FIG. 4 shows a plurality of separated seed grains and a plurality of produced granulate portions after matching the rotational speeds of the separating element and the portioning element to each other.

Once a suitable transmission ratio has been set between the separating element 12 and the portioning element 16, the separated seed grains S and the produced granulate portions D are deposited on the agricultural area 100 with an identical depositing frequency. FIG. 4 shows such a combined depositing of seed and granulate.

It can be seen that despite a synchronized depositing frequency of the seed grains S and the granulate portions D, an unintended longitudinal spacing between the seed grains S and the granulate portions D can result if the intended longitudinal spacing is zero in the case that the seed grains S and granulate portions D are deposited at different depositing depths. This unintended longitudinal spacing is due to an unsuitable rotational angle relationship between the separating element 12 and the portioning element 16. The unsuitable rotational angle relationship can be corrected by setting a suitable phase shift between the rotational movements of the separating element 12 and the portioning element 16. For this purpose, the control device is configured to match the rotational angles $\alpha_K$, $\alpha_D$ of the separating element and the portioning element 16 to implement a predetermined longitudinal spacing of the seed grains S and the granulate portions D on the agricultural area 100. The intended longitudinal spacing of the separated seed grains S and the individual granulate portions D respectively assigned to the separated seed grains S on the agricultural area 100 is preferably zero, as shown in FIG. 5, since the seed grains S and the granulate portions D are deposited at different depositing depths on the agricultural area 100. The different depositing depths have a sufficient distance from each other to avoid etching of the seed grains S by the granulate D.

For eliminating the longitudinal spacing between the seed grains S and the granulate portions D assigned to the respective seed grains S, the control device is configured to control the separating drive and/or the portioning drive in such a way that the rotational speed of the separating element 12 and/or the rotational speed of the portioning element 16 is temporarily adjusted to change the rotational angle ratio between the separating element 12 and the portioning element 16. For this purpose, the separating element 12 can be temporarily accelerated or decelerated. Alternatively or additionally, the portioning element 16 can be temporarily accelerated or decelerated.

After matching the rotational angles $\alpha_K$, $\alpha_D$ of the separating element 12 and the portioning element 16 to each other, the result is the depositing pattern shown in FIG. 5. The individual depositing positions $x_{D1}$-$x_{D9}$ of the granulate portions now essentially correspond to the depositing positions $x_{K1}$-$x_{K9}$ of the separated seed grains S. The synchronized depositing of seed and granulate portions results, on the one hand, in a considerable saving of the required granulate material and, on the other hand, in an improved granulate supply in the vicinity of the seed grains S.

For example, the separating element 12 and the portioning element 16 may be mechanically coupled to each other. The coupling can be implemented by means of a mechanical transmission, for example. The mechanical transmission may include a chain or belt drive. The rotational angle relationship between the separating element 12 and the portioning element 16 can be adjusted by means of a chain or belt tensioner.

The matching of the rotational movements of the separating element 12 and the portioning element 16 can also be implemented by suitable control of the separating drive and/or the portioning drive by the control device. Here, for example, the control device can take into account current rotational angles $\alpha_K$, $\alpha_D$ of the separating element 12 and/or the portioning element 16. Alternatively or additionally, the control device can take into account presence times of separated seed grains S within a detection area in a grain depositing channel 18 behind the separating device 10 and/or presence times of produced granulate portions D within a granulate detection area in a granulate depositing channel 20 behind the portioning device 14.

Furthermore, the agricultural application machine may comprise a camera and/or sensor system by means of which deposited seed grains S and/or deposited granulate portions D can be detected on the agricultural area 100. Thus, when matching the rotational movements of the separating element 12 and the portioning element 16 to each other, the control device can take into account depositing times of separated seed grains S and/or depositing times of produced granulate portions D on the agricultural area 100.

REFERENCE SYMBOL LIST

10 Separating device
12 Separating element
14 Portioning device
16 Portioning element
18 Grain depositing channel
20 Granulate depositing channel
100 Agricultural area
S Seed grains
D Granulate portions
$L_K$ Length of the grain depositing channel
$L_D$ Length of the granulate depositing channel
$x_{D1}$-$x_{D9}$ Depositing positions
$x_{K1}$-$x_{K15}$ Depositing positions
$\alpha_K$ Rotational angle
$\alpha_{K1}$-$\alpha_{K20}$ Provision angle
$\alpha_D$ Rotational angle
$\alpha_{D1}$ Provision angle
$\Delta\alpha$ Angular distance

What is claimed is:

1. An agricultural application machine for the combined application of seed and granulate on an agricultural area, the agricultural application machine comprising:
   a separating device, the separating device comprising a separating drive and a separating element, the separating drive rotationally driving the separating element to separate seed grains (S), and
   a portioning device, the portioning device comprising a portioning drive and a portioning element, the portioning drive rotationally driving the portioning element to produce granulate portions (D);
   wherein a control device controls the rotational movements of the separating element and the portioning element relative to each other to implement a predetermined depositing relationship of the seed grains (S) and the granulate portions (D) on the agricultural area;
   wherein the control device controls the separating drive or the portioning drive to set a rotational speed ratio between the separating element and the portioning element and wherein the control device controls the separating drive or the portioning drive to set a rotational angle ratio between the separating element and the portioning element.

2. The agricultural application machine according to claim 1,
   wherein the control device controls the rotational speeds of the separating element and the portioning element relative to each other to implement a predetermined depositing frequency of the seed grains (S) and the granulate portions (D).

3. The agricultural application machine according to claim 1,
   wherein the control device controls the rotational angles ($\alpha_K$, $\alpha_D$) of the separating element and the portioning element relative to each other to implement a predetermined longitudinal spacing of the seed grains (S) and the granulate portions (D) on the agricultural area.

4. The agricultural application machine according to claim 3,
   wherein the separating element and the portioning element are mechanically coupled to each other.

5. The agricultural application machine according to claim 4,
   wherein the separating device has a grain depositing channel and the portioning device has a granulate depositing channel,
   wherein an opening of the grain depositing channel facing away from the separating device is arranged in front of an opening of the granulate depositing channel facing away from the portioning device in the working direction of the application machine so that the separating device and the portioning device are configured to dispense on the agricultural area.

6. The agricultural application machine according to claim 5,
wherein the control device is configured to take into account one or more of the following parameters when controlling the rotational movements of the separating element and the portioning element relative to each other:
the current rotational angle ($\alpha_K$) of the separating element;
the current rotational angle ($\alpha_D$) of the portioning element;
presence times of separated seed grains (S) within a grain detection area in the grain depositing channel behind the separating device;
presence times of produced granulate portions (D) within a granulate detection area in the granulate depositing channel behind the portioning device.

7. The agricultural application machine according to claim 6,
wherein the control device is configured to take into account one or both of the following parameters when controlling the rotational movements of the separating element and the portioning element relative to each other:
depositing times of separated seed grains (S) on the agricultural area
depositing times of produced granulate portions (D) on the agricultural area.

8. The agricultural application machine according to claim 1,
wherein the control device is configured to take into account one or more of the following parameters when controlling the rotational movements of the separating element and the portioning element relative to each other:
a length ($L_K$) of a grain depositing channel behind the separating device;
a length ($L_D$) of a granulate depositing channel behind the portioning device;
a length ($L_K$) of a grain depositing channel behind a grain detection area in the grain depositing channel in which the presence of separated seed grains (S) is monitored;
a length ($L_D$) of a granulate depositing channel behind a granulate detection area in the granulate depositing channel in which the presence of produced granulate portions (D) is monitored;
the rotational speed of the separating element;
the rotational speed of the portioning element;
a current travel speed of the agricultural application machine;
an intended sowing thickness or an intended seed application rate.

9. The agricultural application machine according to claim 8,
wherein the control device, when controlling he rotational movements of the separating element and of the portioning element relative to each other, determines the time required for the seed grains (S) or the granulate portions (D) to be deposited on the agricultural area,
wherein the control device preferably takes into account the following for this purpose:
a grain weight of the seed grains (S),
a portion weight of the granulate portions (D),
a grain shape of the seed grains (S),
a granulate shape,
a grain size of the seed grains (S),
a surface condition of the seed grains (S),
a surface condition of the granulate,
a blower pressure of a blower, the blower generating an air flow transporting the seed grains (S); or
a blower pressure of a blower, the blower generating an air flow transporting the granulate portions (D).

10. The agricultural application machine according to claim 1,
wherein the control device controls the separating drive so that the rotational speed of the separating element is temporarily adjusted to change the rotational angle ratio between the separating element and the portioning element.

11. The agricultural application machine according to claim 1,
wherein the control device controls the portioning drive so that the rotational speed of the portioning element is temporarily adjusted to change the rotational angle ratio between the separating element and the portioning element.

12. A method for a combined application of seed and granulate to an agricultural area using an agricultural application machine,
the agricultural application machine comprising
a separating device comprising a separating drive and a separating element,
a portioning device comprising a portioning drive and a portioning element, and
a control device coordinating the rotational movements of the separating element and the portioning element;
the method comprising the steps of:
(i) rotationally driving, by the separating drive, the separating element to separate seed grains (S), and
(ii) rotationally driving, by the portioning drive, the portioning element to produce granulate portions (D);
(iii) controlling, by the control device, the rotational movements of the separating element and the portioning element relative to each other to implement a predetermined depositing relationship of the seed grains (S) and the granulate portions (D) on the agricultural area;
wherein in step (iii) the separating drive or the portioning drive is controlled by the control device to set a a rotational speed ratio between the separating element and the portioning element and wherein in step (iii) the separating drive or the portioning drive is controlled by the control device to set a rotational angle ratio between the separating element and the portioning element.

13. The method according to claim 12,
wherein step (iii) is performed by
controlling the rotational speeds of the separating element and the portioning element relative to each other to implement a predetermined depositing frequency of the seed grains (S) and the granulate portions (D) using the control device;
controlling the rotational angles ($\alpha_K$, $\alpha_D$) of the separating element and the portioning element relative to each other to implement a predetermined longitudinal spacing of the seed grains (S) and the granulate portions (D) on the agricultural area using the control device.

14. The method according to claim 12,
wherein the rotational movements of the separating element and the portioning element are controlled relative to each other by a mechanical coupling of the separating element and the portioning element.

15. The method according to claim 12,
wherein step (iii) is performed using at least one of the following parameters:
the current rotational angle ($\alpha_K$) of the separating element;
the current rotational angle ($\alpha_D$) of the portioning element;
presence times of separated seed grains (S) within a grain detection area in a grain depositing channel behind the separating device;
presence times of produced granulate portions (D) within a granulate detection area in a granulate depositing channel behind the portioning device.

16. The method according to claim 12,
wherein step (iii) is performed using at least one of the following parameters:
depositing times of separated seed grains (S) on the agricultural area;
depositing times of produced granulate portions (D) on the agricultural area.

17. The method according to claim 12,
wherein step (iii) is performed using at least one of the following parameters:
a length ($L_K$) of a grain depositing channel behind the separating device;
a length ($L_D$) of a granulate depositing channel behind the portioning device;
a length ($L_K$) of a grain depositing channel behind a grain detection area in the grain depositing channel, in which the presence of separated seed grains (S) is monitored;
a length ($L_D$) of a granulate depositing channel behind a granulate detection area in the granulate depositing channel in which the presence of produced granulate portions (D) is monitored;
the rotational speed of the separating element;
the rotational speed of the portioning element;
a current travel speed of the agricultural application machine;
an intended sowing thickness or an intended seed application rate.

* * * * *